United States Patent [19]
Hughes

[11] Patent Number: 4,575,614
[45] Date of Patent: Mar. 11, 1986

[54] PIPE THAWING APPARATUS

[76] Inventor: Douglas B. Hughes, Rideau Ferry, Ontario, Canada

[21] Appl. No.: 533,529

[22] Filed: Sep. 16, 1983

[30] Foreign Application Priority Data

Jun. 2, 1983 [CA] Canada .................................. 429506

[51] Int. Cl.$^4$ ......................... H05B 1/02; F24H 1/10; E03B 7/14; F16L 53/00
[52] U.S. Cl. .................................. 219/300; 137/341; 138/33; 219/308; 219/327
[58] Field of Search ............... 219/300, 301, 307, 308, 219/327; 138/32, 33; 137/341

[56] References Cited

U.S. PATENT DOCUMENTS

| | | | |
|---|---|---|---|
| 1,733,250 | 10/1929 | Davis | 138/33 |
| 2,306,831 | 12/1940 | Proctor | 219/300 |
| 2,909,638 | 10/1959 | Trabilcy | 219/300 |
| 2,981,818 | 4/1961 | Trabilcy | 219/300 |
| 4,002,881 | 1/1977 | West | 219/301 |
| 4,314,140 | 2/1982 | Hughes | 219/300 |

FOREIGN PATENT DOCUMENTS

| | | | |
|---|---|---|---|
| 631557 | 11/1961 | Canada | 219/300 |
| 1353779 | 1/1964 | France | 219/300 |
| 138541 | 3/1930 | Switzerland | 219/300 |
| 163226 | 10/1933 | Switzerland | 219/300 |
| 218849 | 4/1942 | Switzerland | 219/300 |

Primary Examiner—A. Bartis
Attorney, Agent, or Firm—Wenderoth, Lind & Ponack

[57] ABSTRACT

An electric pipe thawing apparatus for thawing frozen water pipes by passing electric current therethrough incorporates various safety feature rendering the apparatus fail-safe in operation. The apparatus includes an A.C. generator from which can be obtained through a step-down transformer arrangement various voltage levels, from 12 volts upwards, for applying low voltage high current power to the pipe to be thawed. One important safety feature prevents the application of a higher voltage to the pipe unless at a lower voltage level, for example, 20 volts, it has been established by measurement that the current flow in the pipe is above a predetermined level and consequently the circuit through the pipe is a good one. If the circuit is not good, when the operator switches to a higher voltage level a danger signal is illuminated. An automatic tripping feature can be built into the apparatus to interrupt the application of power to the pipe should a higher voltage be applied to a pipe heating circuit which is not a good one as determined by the current flow at the lower voltage.

18 Claims, 8 Drawing Figures

PIPE THAWING APPARATUS

BACKGROUND OF THE INVENTION

This invention relates to apparatus for electrically heating pipes and particularly thawing frozen pipes, hydrants, electric cable ducts and the like.

In the past, welding machines have been used for thawing frozen pipes, often however with disastrous results. The main problem in using a welding machine for this purpose is that the output voltage varies with the size of load so that the voltage delivered can rise immediately to 100 volts or so if the circuit through the pipe is not a good one. This high voltage can drive the current over an alternative path which is usually a combination of ground wires and electrical distribution neutrals which are not designed to carry the resulting high current, resulting in fire hazards.

Machines designed specifically for pipe thawing have been developed and one such machine is described in Canadian Pat. No. 1,090,860 which issued on Dec. 2, 1980 to D. B. Hughes. The known apparatus comprises a movable trailer incorporating a generator, a step-down transformer and two bus bars to which electric cables can be connected. Each bus bar is arranged to accept several cables, one or more cables being connected to one end of a pipe to be thawed and one or more cables of the other bus bar being connected to the other end of the pipe to be thawed. To avoid excessive current in the cables, which gives rise to an inefficient voltage drop in the cables, excessive heating of the cables and other associated problems, the known apparatus includes means for sensing the current flowing in one or more of the cables and warning the operator to add on cables in parallel when the current sensed is excessive. Additionally, the generator is automatically tripped out, in case the warning is ignored.

While the above apparatus is an improvement over the welding machine and works extremely well under most circumstances, problems could still arise if the circuit through which the thawing current is flowing is not a good low resistance pipe circuit. In an extreme case the circuit would be open or, more commonly, the pipe circuit could have high resistance joints bypassed by a ground or neutral wire path of the parallel electrical distribution system. This latter case is not easily detectable because, if checked by an ohm meter, it would give the impression of a good conductive path. In reality, however, the neutral or ground wire is not of sufficient gauge to carry the large currents necessary for thawing. What can happen then is that, the operator, not knowing that he has a poor pipe path simply increases the voltage to attempt to obtain a sufficiently high current to thaw, and this can have the effect of damaging the neutral or ground wires in the service entrances of the neighbouring house. This can actually cause an immediate fire but more usually what would happen is that the insulation on the wire is damaged by heating, this damage not being readily apparent. However this can set the scene for fire or electrical shock occurring weeks or months later.

It is therefore a principal object of the present invention to overcome the above hazard.

SUMMARY OF THE INVENTION

A pipe thawing apparatus includes a source of relatively low voltage high current power. A switch is associated with the power source and is operable selectively between at least first and second conditions, the first condition defining a first voltage output and the second condition defining a second voltage output higher than the first output. The selected voltage is applied to a pipe to be thawed and a current transformer senses the current flowing in the pipe. A control circuit is connected to the current transformer and to the switch. The control circuit is operable when the switch is in the first condition and the current sensed is above a predetermined value to permit, on subsequent switching of the switch means to the second switch condition, application of the second voltage output to the pipe but when the current sensed is below the predetermined value to prevent application of the second voltage to the pipe.

The principal advantage of the machine of the present invention is that it is fail-safe in that it will not permit higher voltages to be applied until it has previously established that the current path is a good one.

DESCRIPTION OF THE DRAWINGS

The invention will now be described in greater detail with reference to the accompanying drawing in which.

DESCRIPTION OF PREFERRED EMBODIMENT

Figure 1A:
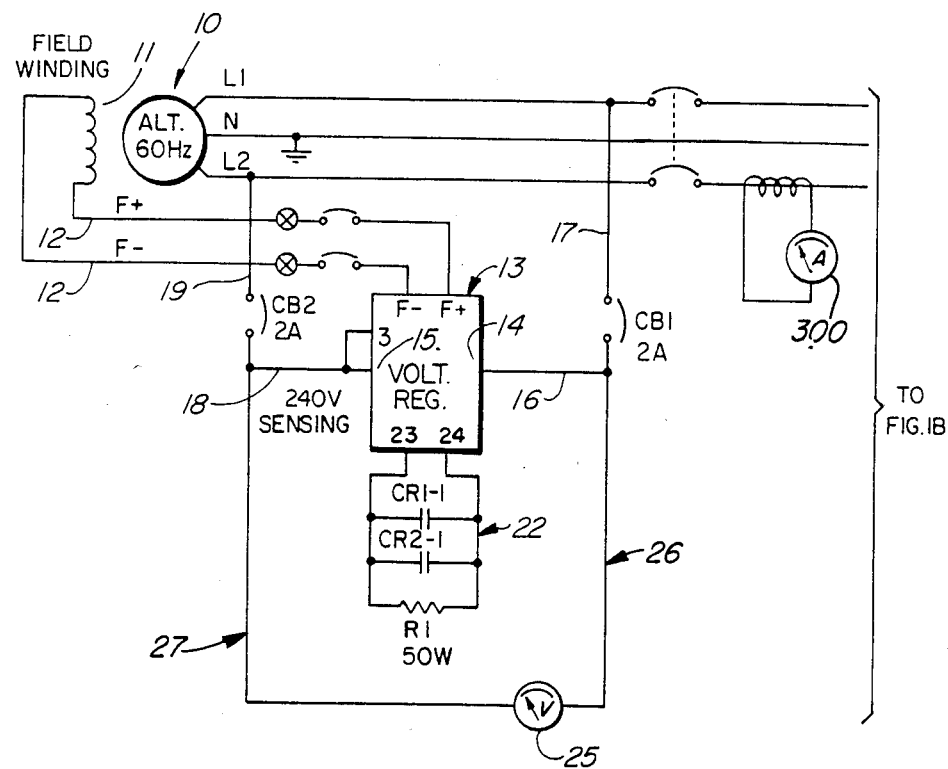
FIGS. 1A to 1C together represent a schematic diagram showing the main electrical components and interconnections in a pipe thawing machine constructed according to the present invention.
Figure 1B:
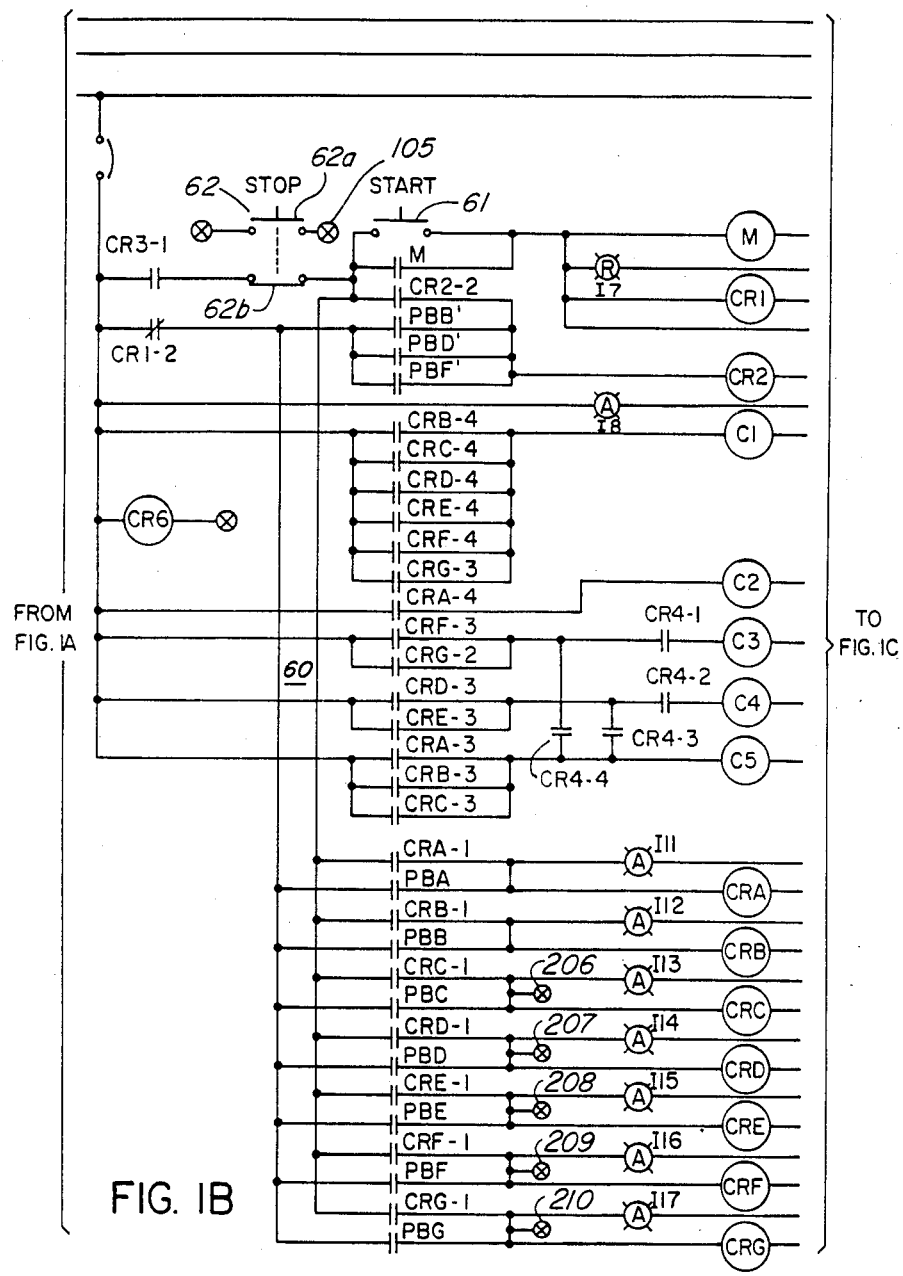
Figure 1C:
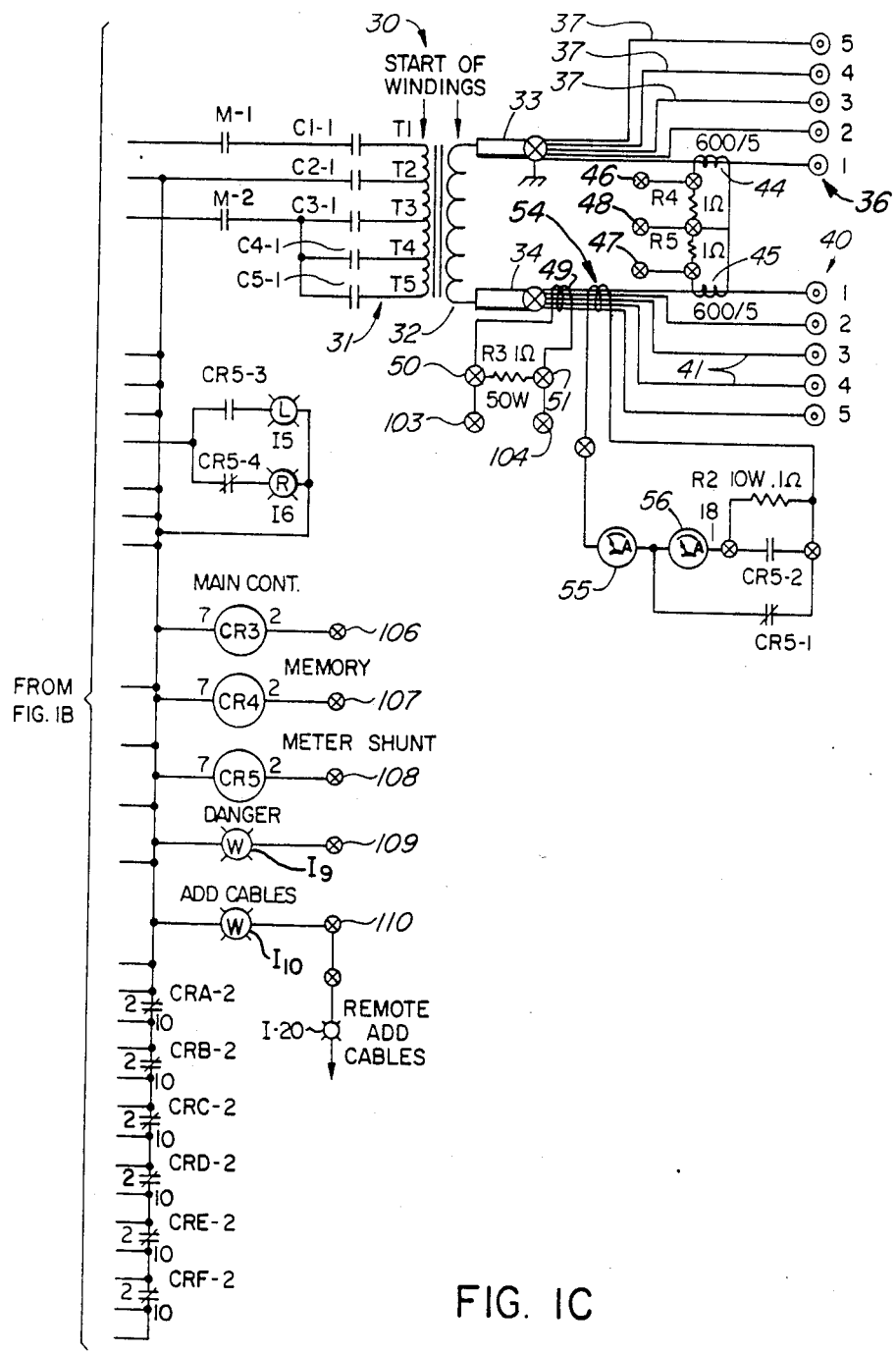
Figure 2:
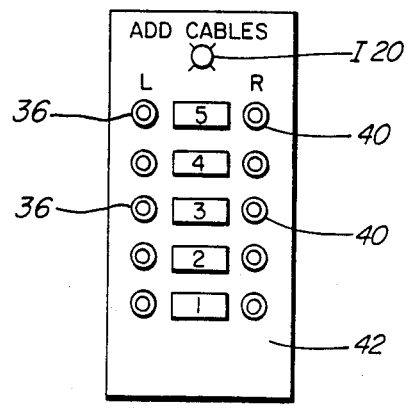
FIG. 2 shows the arrangement of cable sockets on a panel on the pipe thawing machine.

Before commencing with a detailed description of the drawings, the general configuration and operation of the pipe thawing machine of the invention will be described. FIGS. 1A–1C show the main circuitry of the machine by which various output voltages as desired can be supplied to a panel 42 (FIG. 2) having sockets in which pairs of pipe thawing cables can be manually inserted. Various parameters are monitored and processed in the control circuitry of FIGS. 3A–3C to provide control signals that are fed back to the machine of FIGS. 1A–1C thereby influencing the operation of the machine.

Referring now to FIGS. 1A–1C, the pipe thawing machine is a modified mobile generator in which a gasoline or diesel engine drives the rotor of a 60 Hz brushless alternator. The engine is not shown in the drawing, being of any suitable conventional type, but the alternator is referenced generally 10. The alternator has a field winding 11 supplied via lines 12 with a field voltage from a voltage regulator 13. The alternator has two output lines L1 and L2 and a grounded neutral output N. Sensing inputs 14 and 15 of voltage regulator 13 are connected via lines 16 and 17 and lines 18 and 19 to output lines L1 and L2, respectively. In this way voltage regulator 13 monitors the line voltage on lines L1 and L2 and regulates it to the designed value, namely 240 volts.

As a refinement, voltage regulator 13 is provided with circuitry 22 which is connected across control inputs 23 and 24 of voltage regulator 13. Circuitry 22 comprises normally closed relay contacts CR1-1 in parallel with normally closed relay contacts CR2-1 which are in turn in parallel with resistor R1. Under certain circumstances, described in detail below, the pairs of contacts CR1-1 and CR2-1 both open to place the resistance of R1 across control inputs 23 and 24. The value of R1 is chosen such that the regulated voltage of voltage regulator 13 drops from 240 V to 220 V. Typically R1 is a 50 W 125Ω resistor.

The actual line voltage being delivered at any time can be checked visually on a 0–300 V voltmeter 25 connected via lines 17, 26, 27 and 19 across lines L1 and L2. Similarly, the $L_2$ line current is indicated by ammeter 300.

Lines L1 and L2 are connected to a step-down transformer 30 through a main circuit breaker MCB1, contacts M-1 and M-2 of a main contactor M and contacts C1-1, C3-1, C4-1 and C5-1 of contactors C1, C3, C4 and C5, respectively. Neutral line N is connected through contact C2-1 of a contactor C2 to the transformer 30. More particularly the primary winding 31 of the transformer is formed with taps T1, T2, T3, T4 and T5, T1 and T5 being located at opposite ends. Contacts C1-1, C2-1, C3-1, C4-1 and C5-1 are respectively connected to taps T1-T5. Each of contacts C3-1, C4-1 and C5-1 are connected in common to line L2.

It should be apparent that by energizing particular contactors different primary voltages can be applied to transformer 30. For example if contactors C2 and C5 only are energized, contacts C2-1 and C5-1 are closed thereby applying 120 volts between T2 and T5. If, contactors C1 and C5 in addition to contactors CR1 and CR2 are energized, contacts C1-1, C5-1 are closed and CR1-1 and CR2-1 are opened a voltage of 220 volts is applied between taps T1 and T5. If contactors C1 and C5 but not CR2 are energized, a voltage of 240 volts is applied across taps T1 and T5. A table showing the relationship between the contactors energized, the primary voltage applied and the secondary voltage received from secondary winding 32 of transformer 30 appears later in this description.

Each end of secondary 32 is connected to a respective bus bar 33 and 34. Five cable sockets 36 are connected in parallel to bus bar 33 via conductors 37 and five cable sockets 40 are connected in parallel to bus bar 34 via conductors 41. The sockets of one group are to be paired up respectively with the sockets of the other group and for that reason the sockets of each group are numbered 1–5. Typically the sockets are arranged on a control panel 42 of the type shown in FIG. 2, the control panel being mounted on the rear of the pipe thawing machine. The groups of sockets are arranged in two columns headed L (left) and R (right) and the pairs are numbered from 1–5 consecutively from the bottom.

A 600/5 stepdown transformer 44 (i.e.—a stepdown current transformer with a 600 to 5 stepdown ratio) is connected to sense the current flowing through the conductor 37 feeding the socket numbered 1 in one group and a similar stepdown current transformer 45 is connected to sense the current flowing through the conductor 41 feeding the socket numbered 1 in the other group. One side of each current transformer is connected to a respective terminal 46 or 47 and the other sides are connected in common to a terminal 48. 1Ω resistors R4 and R5 are connected between each pair of terminals 46 and 48 and 47 and 48. Terminals 46,47 and 48 are connected respectively to signal input terminals 100, 101 and 102 shown in the control circuit of FIG. 3A.

A third 600/5 stepdown current transformer 49 is connected to sense the total current flowing in conductors 41. The two sides of transformer 49 are brought out to terminals 50 and 51 between which a 1Ω resistor R3 is connected. Terminals 50 and 51 are connected respectively to signal input terminals 103 and 104 shown in the control circuit of FIG. 3A.

A 2000/5 stepdown current transformer 54 (i.e.—a stepdown current transformer with a 2000 to 5 stepdown ratio) is also connected so as to sense the total current in conductors 41. One side of transformer 54 is connected to one side of a 0–2000 A ammeter 55. The other side of transformer 54 is connected to the other side of ammeter 55 via a normally closed control relay contact CR5-1 which is connected in parallel with a 0–800 A ammeter 56 and serially connected normally open contact CR5-2. Contacts CR5-1 and CR5-2 are operated by a control relay CR5 which will be described below. A 0.1Ω resistor R2 is connected in parallel with contact CR5-2. It will be understood that ammeter 56 normally is shunted by contact CR5-1, but when relay CR5 is energized, ammeter 56 is connected in series with current transformer 54. Both ammeters 55 and 56 are mounted on the control panel of the machine.

Connected between lines N and L2 which extend between alternator 10 and transformer 30 is a bank of push buttons, control relays, contactors, contacts and pilot lights, the bank being generally referenced 60. The push buttons include a "START" button 61, a double pole "STOP" push button 62 and seven voltage selection push buttons A–G which respectively operate switches PBA, PBB, PBC, PBD, PBE, PBF and PBG by means of which the operator can select a desired secondary voltage on transformer 30 of 12 volts, 18 volts, 20 volts, 22 volts, 24 volts, 27 volts or 30 volts, respectively. More particularly, each switch is connected in series with a respective control relay CRA, CRB, CRC, CRD, CRE, CRF and CRG. These relays have various normally open and various normally closed contacts which are reversed when the relays are energized by depression of the respective push button. The relay contacts are indicated by the reference letters CRA-1, CRA-2 etc, CRB-1, CRB-2 etc, CRC-1, CRC-2 etc, CRD-1, CRD-2 etc, CRE-1, CRE-2 etc, CRF-1, CRF-2 etc and CRG-1, CRG-2 etc. Switching of these relay contacts causes selective energization of contactors M and C1 to C5 and control relays CR1 and CR2 thereby selecting appropriate taps T1–T5 of transformer 30 to provide the desired output voltage. The following table relates the operation of the switches PBA-PBG to energization of the contactors C1–C5 and control relay CR2 and to the primary and secondary voltages.

TABLE 1

| SWITCH | Coils Energized | | | Primary Volts | Taps | Secondary Volts |
|---|---|---|---|---|---|---|
| PBA | C2 | C5 | | 120 | T2-T5 | 12 |
| PBB | C1 | C5 | CR2 | 220 | T1-T5 | 18 |
| PBC | C1 | C5 | | 240 | T1-T5 | 20 |
| PBD | C1 | C4 | CR2 | 220 | T1-T4 | 22 |
| PBE | C1 | C4 | | 240 | T1-T4 | 24 |
| PBF | C1 | C3 | CR2 | 220 | T1-T3 | 27 |
| PBG | C1 | C3 | | 240 | T1-T3 | 30 |

Various pilot lights or indicator lamps I11–I17 are connected in series with relay contacts CRA-1 to CRG-1 so that a specific indicator lamp is illuminated when a particular push button is pressed.

Control relay CR1 has contacts CR1-1 in voltage regulator circuit 22 as described above and a normally closed contact CR-2 connected in series with control relay CR2 via mutually parallel connected switch contacts PBB', PBD' and PBF'. Each of these contacts is closed when the associated switch PBB, PBD or PBF is closed. Control relay CR2 has, in addition to contact CR2-1 in voltage regulator circuit 22 as described above, normally open contact CR2-2 which is connected to a line 64 for supplying indicator lamps I11-I17.

Figure 3A:
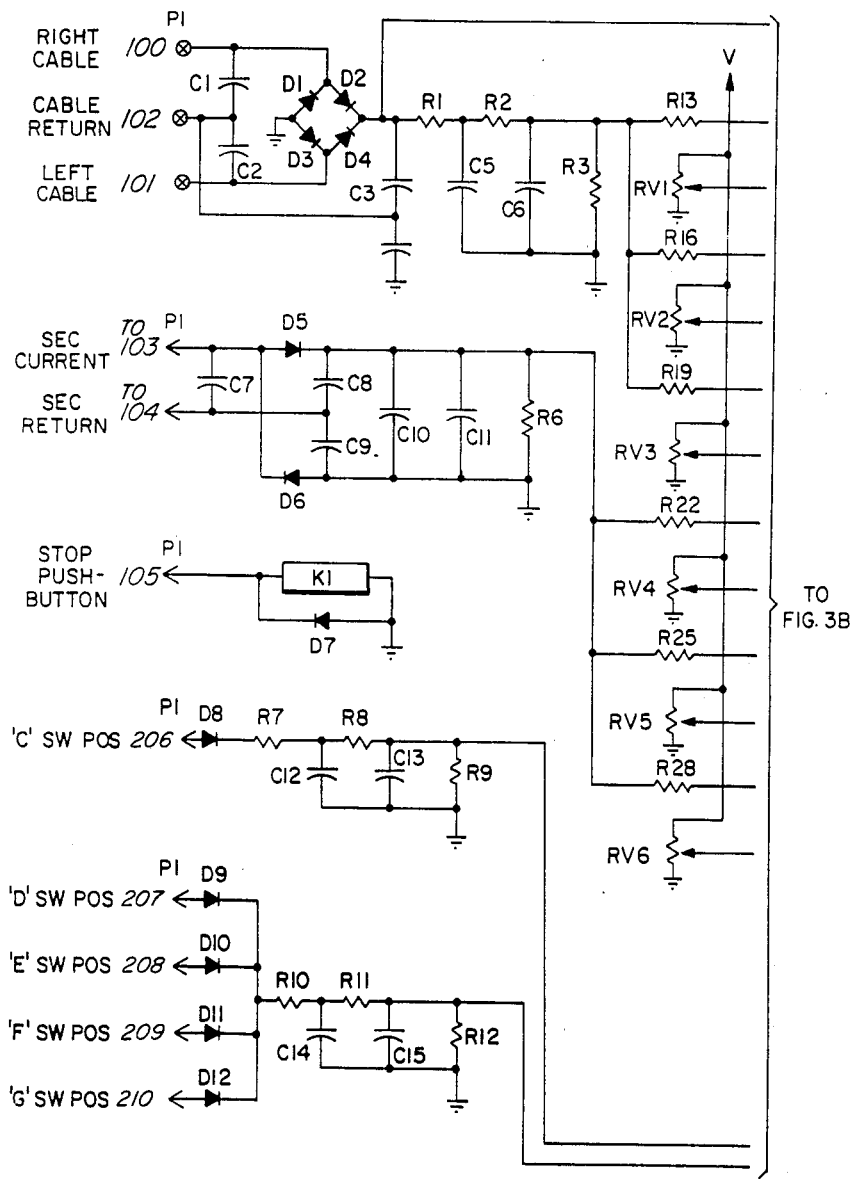
FIGS. 3A to 3C together represent a schematic diagram showing the main electrical components and interconnections in a control circuit constructed according to the present invention and used to control the operation of the pipe thawing machine of FIGS. 1A—1C.
Figure 3B:
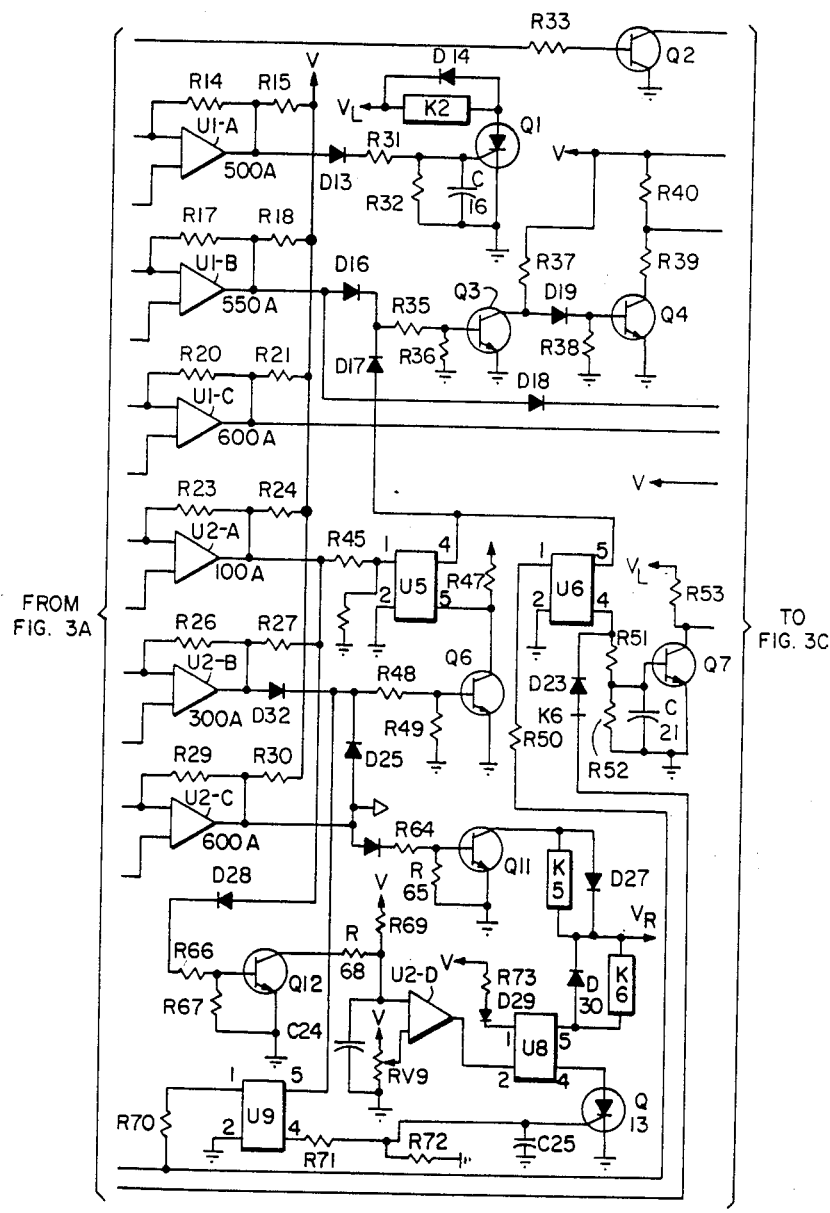
Figure 3C:
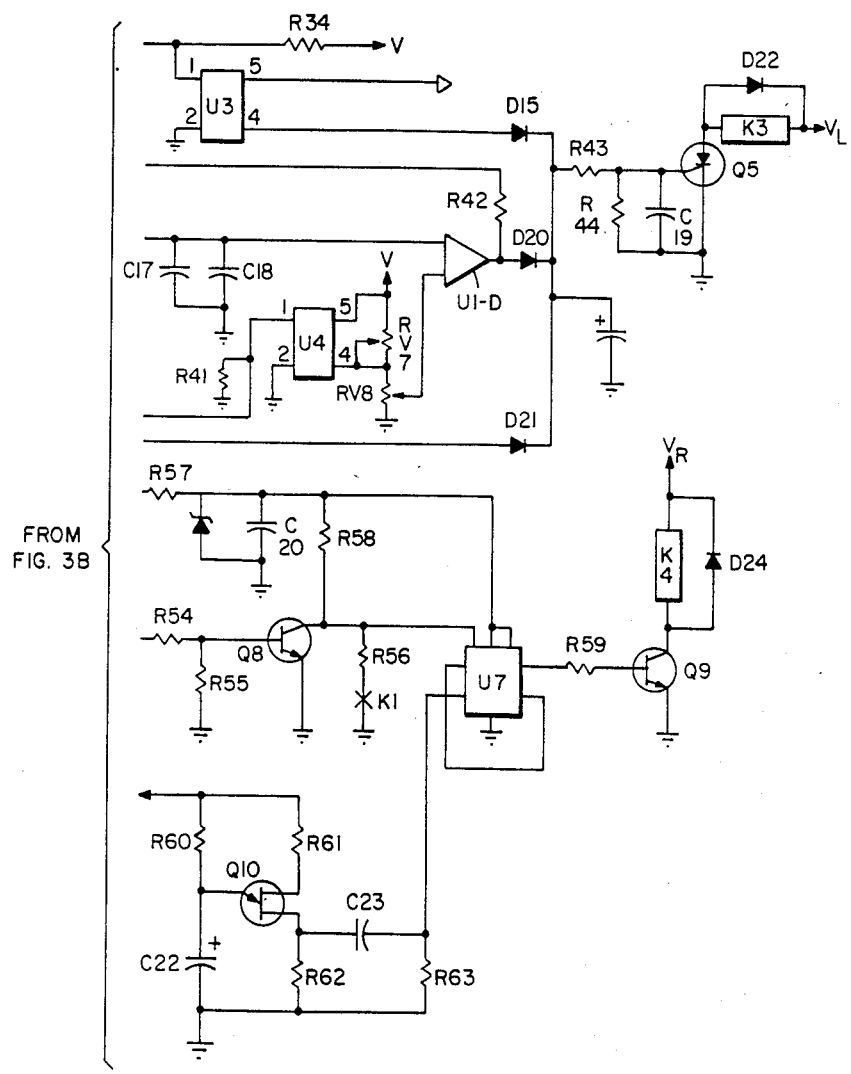

In addition to the contactors and control relays described above, also shown in FIG. 1C are control relays CR3, CR4 and CR5 supplied from three control output terminals 106, 107 and 108 of the control circuit of FIGS. 3A–3C. Control relay CR3 has a normally open contact CR3-1 in series with the start button 61 and main contactor M. Control relay CR4 has normally open contacts CR4-1 and CR4-2 serially connected with contactors C3 and C4, respectively, and normally closed contact CR4-4 and CR4-5 connected, respectively, between contactors C3 and C5 and contactors C4 and C5. Control relay CR5 has, in addition to contacts CR5-1 and CR5-2 connected to ammeters 55 and 56, normally open contact CR5-3 connected serially with indicator lamp I5 and normally closed contact CR5-4 serially connected with indicator lamp I6.

Two further control output terminals 109 and 110, from the control circuit of FIG. 3 are provided and these serve to energize lamps I9 and I10 respectively.

In addition to terminals 100–104 by means of which signals indicative of the current in the pipe thawing cables are input to the control circuit of FIGS. 3A–3C, six other signal input terminals for inputting information from the machine of FIGS. 1A–1C to the control circuit of FIGS. 3A–3C are provided. The first is terminal 105 which is connected to a 12 volt supply terminal through a normally open pole 62a of "Stop" button 62. A normally closed pole 62b of "Stop" button 62 is connected in series with the "Start" button 61 and the main contactor M. The other five input terminals are terminals 206–210 which are connected respectively to the junction of switch PBC and control relay CRC, switch PBD and relay CRD, push button PBE and relay CRE, push button PBF and relay CRF and switch PBG and relay CRG.

The pipe thawing machine of FIGS. 1A–1C is operated as follows. When the operator wishes to thaw a house service pipe he connects one end of each of a pair of 4/0 cables to socket pair 1 of sockets 40 on the pipe thawing machine and the other ends of the cables, respectively, to the copper, or other metal, service pipe in the basement as close to the foundation as possible and to the nearest hydrant. He then pushes button A to energize switch PBA to request 12 volts across bus bars 33 and 34. This causes energization of control relay CRA and thereby closure of contacts CRA-1, CRA-3, and CRA-4 and opening of CRA-2. Closure of CRA-1 causes illumination of indicator lamp I11 and closure of contacts CRA-3 and CRA-4 causes energization of contactors C5 and C2 which, as can be seen from Table 1 above, provides the correct transformer tapping for a 12 volt secondary output. Opening of CRA-2 prevents the other switches from being activated while switch PBA is activated.

The operator then pushes START button 61 which energizes the main contactor M thereby delivering the 12 volts to the pair of cables. It can be seen that pilot light I7 is also energized and this indicates to the operator that pipe thawing is in progress. It should be understood that under normal circumstances 12 volts will be insufficient to thaw the pipe. The purpose of using 12 volts is to establish without danger that a good connection between the cables and the pipe has been established. If a reading of 100 amps or so is obtained on ammeter 56 the operator will know that there is a good connection and will be free to increase the voltage. This is done by pushing STOP button 62 followed by energizing switch PBB and again pushing the START button 61 to apply 18 volts across the pair of cables. If the current on ammeter 56 increases appreciably, this indicates to the operator that the connections are still good and the current is flowing through the pipe.

The operator will again push STOP energizing switch 62 followed by button PBC requesting 20 volts and then pushes START button 61 which once more closes main contactor M thereby applying 20 volts to the pair of cables. Again the current flowing should increase but this time it is not left up to the operator to judge. The secondary current is being sensed by current transformers 44, 45 and 49 and this circuit is monitored in the control circuit of FIGS. 3A–3C. The structure and operation of the control circuit of FIGS. 3A–3C will be described in detail later. For the present, suffice it to say that, if the current flowing in the cables is sufficiently high, the control circuit of FIGS. 3A–3C will enable the operator to select a higher voltage by providing a voltage on control output 107 which energizes control relay CR4. Energization of control relay CR4 closes contacts CR4-1 and CR4-2 enabling contactors C3 and C4 to be energized when switches PBD, PBE, PBF or PBG, are appropriately energized by the operator by pushing their respective push buttons. At the same time, contacts CR4-3 and CR4-4 are opened to cut out contactor C5. Table 1 shows that this enables 22, 24, 27 and 30 volts to be applied to the pair of cables.

If, on the other hand, the current being monitored is so low as to indicate that there is a fault in the pipe circuit, for example due to a high resistance joint or a leak through a ground wire or hydro neutral circuit, the control circuit prevents application by the operator of a voltage greater than 20 volts by failing to energize control relay CR4. At the same time, warning light I9 is energized by an output signal on terminal 109, warning the operator of a potentially hazardous situation, i.e. 20 volts and bad circuit. In addition to the warning light I9 being energized which is an instruction to the operator to switch off the machine, the control circuit of FIGS. 3A–3C arranges for the main contactor M to trip automatically after a duration of 1 minute if the operator fails to respond. This is brought about by the lack of a voltage on control output 106, deenergizing control relay CR3 thereby opening contact CR3-1 in the main contactor circuit. Incidentally, the control circuit of FIGS. 3A–3C arranges for the main contactor to trip after a duration of 1 minute for any push button switch position if the current is not sufficiently high but the "DANGER" light comes on only when switches PBC, PBD, PBE, PBF or PBG have been energized.

When the operator receives the warning or directive that there is a bad circuit he should move the cable connected to the hydrant if possible to a hydrant on the other side of the house where the thawing is to be done to see if he has a better path from that point. If he still has a bad circuit, the machine will again indicate this, and it will then be necessary to try a curb stop on the house next door, on either side of the house being thawed or one across the street until such time as the machine indicates a good circuit.

Each time the operator changes connections it is necessary to start again with the switch PBA and work his way up. This ensures that higher voltages can be impressed only when good circuits have been established.

At the same time as monitoring the voltage impressed and current flowing, the control circuit of FIGS. 3A–3C also arranges switching over from the low-scale or 8–800 amp. ammeter 56 to the 0–2000 amp. ammeter 55 at approximately 600 amps, thereby allowing the operator to obtain more precise readings on the lower range. This is done by removing a voltage at control terminal 108, thereby deenergizing control relay CR5 which causes closing of contact CR5-1 and opening of contact CR5-2, shunting ammeter 56.

Figure 4:
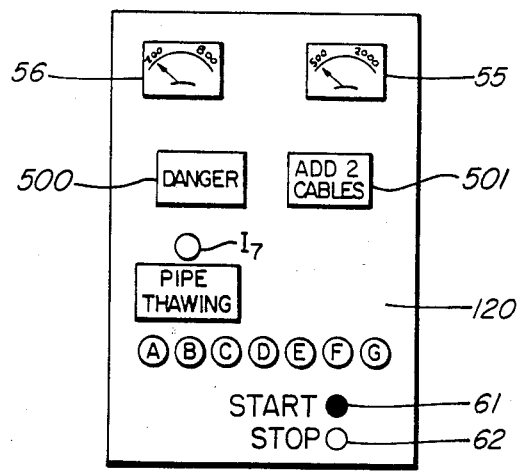
FIG. 4 shows the main control panel on the pipe thawing machine.

FIG. 4 shows the layout of the control panel on which are located all the push buttons which operate switches PBA to PBG, the START button 61 and STOP button 62, ammeters 55 and 56 and the "DANGER" light which is an illuminable rectangle. The indicator I7 is also shown above a plaque specifying "PIPE THAWING".

The control circuit of FIGS. 3A–3C also monitors the current flowing in the individual cables and when this reaches 500 amps, a voltage appears at output terminal 110 to energize pilot light I10 and a light I20 on panel 42. Light I10 is used to illuminate a rectangular panel marked "ADD 2 CABLES" located on control panel 120 and light I20 is also marked with the legend "Add Cables". If the operator does not follow this directive and increases the output voltage without adding cables, the control circuit arranges to trip main contactor M immediately if the circuit in a single cable exceeds 600 amps or to trip contactor M after 4 minutes if the current is between 550 and 600 amps. This is achieved by removing the voltage from control output terminal 106.

The control circuit shown in FIGS. 3A–3C will now be described. Essentially there are five different types of component circuits, namely
a. input (signal conditioning)
b. voltage sensing
c. logic
d. timing
e. output

Input Circuits

1. Terminals 100, 101 and 102 are input terminals connected as shown in FIG. 1C to terminals 46, 47 and 48 of current transformers 44 and 45. Diodes D1 to D4, resistors R1 to R3 and capacitors C1 to C6 constitute a dual input voltage doubling rectifier and filter. The two inputs between terminals 100–102 and 101–102 are 60 Hz a.c. 0–5 volts. The common output across resistor R3 is 0–10 volts d.c.

2. Terminals 103 and 104 are input terminals connected as shown in FIG. 1C to terminals 50 and 51 of current transformer 49. Diodes D5 and D6, resistors R4 to R6 and capacitors C7 to C11 constitute a single input voltage doubling rectifier and filter. The input between terminals 103 and 104 is 60 Hz a.c. 0–5 volts. The output across resistor R6 is 0–10 volts d.c.

3. Terminal 105 is connected as shown in FIG. 1B to a 12 volt d.c. source (not shown) through STOP button 62. Terminal 105 is connected to a relay K1 having a diode D7 in shunt therewith. When relay K1 is energized its contacts (not shown) open to remove the voltage VL which is normally applied to various components as shown. Removal of VL serves as a reset for all the latching features of the control circuit.

4. Terminal 206 is as shown in FIG. 1 connected to switch PBC. Diode D8, resistors R7 to R9 and capacitors C12 and C13 constitute a rectifier and filter. The input on terminal 206 is 120 volts a.c. and the output across resistor R9 is 12 volts DC. The 120 volts input is, of course, applied only when button C has been depressed.

5. Terminals 207–210 are as shown in FIG. 1 respectively connected to switches PBD to PBG. Diodes D9 to D12, resistors R10 to R12 and capacitors C14 and C15 constitute a four input rectifier and filter. The inputs on terminals 107 to 110 are 120 volts a.c. and the common output across resistor R12 is 12 volts d.c. The 120 volts input is applied, of course, only when one of buttons D to G has been depressed.

Voltage Sensing

Six level sensing voltage comparators U1-A, U1-B, U1-C, U2-A, U2-B, U2-C are provided. They each have an input connected to a respective potentiometer RV1 to RV6 which sets reference voltages corresponding, respectively, to 500 amps, 550 amps, 600 amps, 100 amps, 300 amps and 600 amps for comparators U1-A to U1-C and U2-A to U2-C, respectively, as marked on the drawing. Comparators U1-A to U1-C each have another input connected in common to resistor R3 which is the output from the first input circuit described above. The other three comparators have their second inputs connected in common to resistor R6 which is the output of the second input circuit described above. When the voltage output from resistor R3 or R6, as the case may be, exceeds a reference voltage a high output signifying that a particular current value has been exceeded is obtained from the associated comparator.

Logic

The outputs from the comparators described above are fed through logic circuits directly or indirectly. These include three OR gates, one formed by diodes D16 and D17, one by diodes D15, D20 and D21 and one by diodes D25 and D32. Completing the logic circuits are AND gates formed, respectively, by four opto-isolators U3, U5, U6 and U9. In each case the opto-isolator has two pins P1 and P5 which are used as inputs and a pin P4 as output. A high signal appears on P4 if a high is present on both P1 and P5.

Timing

There are two timing circuits. The first comprises transistors Q3 and Q4, opto-isolator U4 and voltage comparator U1-D. The input to this timer is the output of OR gate D16 and D17. Transistors Q3 and Q4 are amplifiers and inverters which start and stop the timer. Resistor R40 together with capacitors C17 and C18 are the timing elements. Voltage comparator U1-D compares the voltage on timing capacitors C17 and C18 with a reference voltage from potentiometers RV7 and RV8. The voltage on capacitors C17, C18 slowly rises and when it reaches the same level as the reference voltage the output of comparator U1-D goes high. Opto-isolator U4 selects which one of two time intervals (RV7 or RV8) is in effect by providing an output at pin P4 only if there is an input at pin P1.

The second timer comprises transistor Q12 and voltage comparator U2-D. The base of transistor Q12 is connected to the output of voltage sensing comparator U2-A. Transistor Q12 starts and stops the timer. Resistor R69 and capacitor C24 are the timing elements. Potentiometer RV9 sets the point at which comparator U2-D will change its output to high. The timer is set to give a 15 second delay between the time the input to the base of transistor Q12 goes low and the output of comparator U2-D goes high.

Outputs

The outputs of the control circuit are all through relays of which there are five, namely K2, K3, K4, K5 and K6. Relays K2 and K3 are latching relays, i.e. when energized they remain energized until relay K1 is energized by the STOP button thereby removing voltage VL from SCR's Q1 and Q5 which resets relays K2 and K3.

Relay K4 is connected via a flashing circuit formed of UJT transistor Q10 resistor R60, capacitor C22 etc. and flip-flop U7. The on/off control of the flasher is at pin P1 of flip-flop U7. Transistors Q7 and Q8 transmit any output signal from AND gate U6 to pin P1 of flip-flop U7. Pin P5 of flip-flop U7 is the output pin and this is connected to drive a transistor Q9 thereby to energize relay K4. Relay K5 is energized via a transistor Q11 which is connected to the outputs of comparator U2-C via diode D26. Relay K6 is connected to output pin P5 of opto-isolator U8 the set pin P4 of which is connected to SCR Q13 and the reset pin P2 of which is connected to the output of comparator U2. The gate of SCR Q13 is connected to the output of AND gate U9.

It should be understood that relays K2-K6 have contacts which are switched when the relays are energized or deenergized. The contacts are not shown but they are understood to be connected to a voltage source and to terminals 106-110 shown in FIG. 1C, which terminals are the control outputs of the control circuit of FIGS. 3A-3C. The contacts associated with relay K2 are normally open so that no voltage usually appears on terminal 110. The contacts associated with relay K3 are normally closed so that a voltage appears on terminal 106 to energize control relay CR3 (FIG. 1C). The contacts associated with relay K4 are normally open so that no voltage usually appears on terminal 109. The contacts associated with relay K5 are normally closed so that a voltage usually appears at terminal 108 thereby energizing relay CR5 (FIG. 1C). The contacts associated with relay K6 are normally open so that usually no voltage appears on terminal 107 and relay CR4 (FIG. 1C) is not energized.

The general description of the operation of the machine with reference to FIGS. 1A-1C will now be complemented by a more specific description referring principally to FIGS. 3A-3C. As indicated previously, when the machine senses a good circuit when the operator has selected push button C, the machine permits the operator to select a higher voltage. How this function is achieved will be described with reference to FIG. 3.

Voltage Control

If a current greater than 300 amps is flowing in the transformer secondary, a "high" will appear at the output of voltage comparator U2-B and this "high" is applied to pin P5 of AND gate U9. If, at the same time push button C is in the depressed state, a "high" voltage is being applied to pin P1 of gate U9. This produces a "high" output at pin P4 of gate U9 which switches on SCR Q13 setting opto-isolator U8 and latching relay K6 on, thereby providing a high voltage on terminal 107. As described above this enables higher voltages to be selected when the other push buttons are then pressed.

If there is a drop in current in the transformer secondary below 100 amps the output of comparator U2-A goes low and the timer Q12, U2-D starts timing. If the low condition remains for at least 15 seconds (the time delay of the timer) opto-isolator U8 is reset and relay K6 deenergized.

DANGER Lamp

If the current flowing in the transformer secondary is between 100 and 300 amps, a "high" will appear at the output of U2-A and a "low" at the output of U2-B. The "low" biases transistor Q6 out of conduction causing a "high" at pin P5 of AND gate U5. The "high" from gate U2-A passes to pin P1 of AND gate U5 and so a "high" appears at the output pin P4 of gate U5. If, at the same time, button C is depressed, AND gate U6 has at its input pin P1 a "high" and from gate U5 a "high" appears on pin P5 of gate U6. Thus, a "high" appears at gate U6 output from P4 which causes the flasher circuit Q7, Q8, U7, Q10 to provide a flashing output energizing relay K4 to light up the "DANGER" sign.

If any of push buttons D-G is depressed and relay K6 is not latched, the voltage appearing on terminal 107, 108, 109 or 110 is passed through closed contact K6-1 to the flashing circuit to energize relay K4 and the "DANGER" sign 500.

ADD 2 CABLES WARNING

If the current flowing in the first pair of cables is 500 amps or more the output of comparator U1-A goes high energizing transistor Q1 and relay K2 thereby lighting up the ADD 2 CABLES sign 501 on the machine.

Main Contactor Tripping

If the current flowing in the first pair of cables is 600 amps or more a "high" appears at the output of comparator U1-C and this passes via diode D21 (part of an OR gate) to SCR Q5 thereby energizing relay K3 and opening its associated normally closed contacts to remove the voltage from terminal 106 thereby tripping the main contactor M via control relay CR3.

If the current flowing in the first pair of cables is between 550 and 600 amps a "high" appears at the output of comparator U1-B. This "high" via diode D18 sets gate U4 to provide a "high" on pin P4 thereby setting the reference voltage input to comparator U1-D to the higher of the two levels.

The "high" from comparator U1-B also, via diode D16 (part of an OR gate) energizes the timing circuit Q3 and Q4 providing an increasing voltage to comparator U1-D which reaches the set reference voltage in about 4 minutes. The output of comparator U1-D thereafter goes "high" and relay K2 is energized via SCR Q5 thereby opening its associated normally closed contacts and tripping main contactor M as before.

If the current flowing in the transformer secondary is between 100 and 300 amps, as indicated above in relation to the operation of the DANGER lamp, a "high" appears at the output of AND gate U5. This "high" is passed through diode D17 to timing circuit Q3, Q4 and U1-D. Since comparator U1-D has the lower reference voltage applied it will take only 1 minute before the output "high" is generated and, as before, the main contactor M will trip.

To summarize the above operation, if after going through the normal sequence of steps a good pipe thawing circuit appears to have been established and a voltage in excess of 20 volts is being applied, should for any reason the load circuit open partially but not completely, thereby increasing the circuit resistance, then within 15 seconds the voltage will drop back to 20 volts. If, at 20 volts, the current lies below the 300 amp level for another minute the main contactor will trip, thereby preventing a voltage of over 20 volts from remaining impressed across the ground or neutral wire.

If the secondary current as indicated by the voltage across terminals 103 and 104 exceeds 600 amps, a "high" appears at the output of comparator U2-C. This "high" passes to pin P5 of AND gate U3. If, at the same time, no current is sensed by either current transformer 44 or 45 the voltage applied to the base of transistor Q2 is zero and so a "high" appears at pin P1 of AND gate U3. In this way a "high" appears at the output pin P4 of gate U3 and this energizes relay K3 as before tripping main contactor M. This prevents the operator from bypassing the first pair of sockets marked 1 on panel 42.

The relay K3 is deenergized by pressing the STOP button as described above.

Ammeter Switching

When the current in the secondary is 600 amps or more, a "high" is obtained, as indicated above, at the output of comparator U2-C. This energizes via transistor Q11 relay K5 which opens the associated normally closed contact to remove the control voltage from terminal 108. Thus relay CR5 (FIG. 1) is deenergized causing shunting of ammeter 56.

Although different designs of generator and transformer could be used in carrying out the present invention, there are certain characteristics which should be exhibited and these are brought out in the following brief description of a practical embodiment.

The engine or prime mover must have a very sensitive governor capable of maintaining its output voltage within a maximum of two percent if possible, whether an open circuit condition or under full load. The prime mover is directly coupled to a brushless alternator also having very good regulation and this in turn is fed to a specially designed heavy duty close-coupled current producing transformer.

A specially designed heavy-duty, close-coupled current transformer uses a wrap around or wound type core; this means that the magnetic flux flows in the same direction as the grain or neutral path of the core steel, and by using this type of core, there is only one joint in each lamination, and therefore only one joint in the magnetic circuit, and these joints of course, are staggered. In other words, these cores utilize the desirable "Parallel to Rolling" characteristics of grain-oriented Silicon Steel, and when assembled, is given a flux path 99.9% parallel to this direction.

The magnetic properties of the completely assembled core closely approximate those of an Epstein sample of an uncut toroid. This, together with the design of the coil, all result in excellent regulation.

The coil is wound with sheet copper, each turn being the full width of the coil. This is of vital importance to maintain the excellent regulation that is required which is a positive hard voltage, whether under load, or open circuit. This type of design prevents the drifting or shortcutting of the flux which would be the case if a wire-wound coil were used. One can readily see that it would be impossible were there only a few turns of wire between taps for the primary winding to embrace the whole secondary winding.

In the design laminated copper has been used for the high current winding, so as to give it the necessary flexibility to keep the coil to a neat configuration permitting it to conform to the size of the winding block which in turn fits neatly over the core.

The taps or the ends of the windings are flat copper strips riveted and soldered across the full width of the winding. These, of course, are of suitable cross section to carry the current for which they are designed.

Due to the output capacity of the pipe thawing machine it was felt that it was advisable to just have the one winding on the secondary, which was a high amperage, namely, 2000 amperes A.C.; and to accomplish the changing of the voltages by means of different taps on the primary. In order to keep the resistance of the secondary of high amperage winding to a minimum, the secondary is wound onto the winding block first; thereby keeping the length of the turns as short as possible.

As described previously, by means of the switching arrangement or tap selection arrangement the transformer can be fed with 240 volts, or 220 volts, or 120 volts. The end result of this particular design is that the output of the pipe thawing machine can be matched more closely to the pipe load, and still maintain a very hard or nonreactive voltage condition. This is one of the essential elements for pipe thawing.

Although the invention has been described hereinbefore as applied to the thawing of pipes it should be apparent that the novel apparatus can be used for heating pipes carrying liquids such as bunker oil, tar, wax, etc. which congeal at temperatures much higher than the freezing point of water. Heating of such pipes keeps them free-flowing. It should be understood that the expression "pipe thawing" used in the description and claims is to be construed broadly enough to cover heating of such pipes in addition to melting ice in water pipes.

Further, instead of providing discrete switch positions at which different voltage levels are selected, a switch, such as a rotary switch, for deriving a graduated voltage output could be used. Again, the main thrust of the invention would be to prevent a relatively high voltage from being applied to the pipe if at a relatively lower voltage position the current was less than a predetermined value.

It is also envisaged that the control circuit of the invention could be arranged actually to prevent a higher switch position from being selected when at a lower switch position the current is low. This could be done using a solenoid actuated lock which would engage the switch when actuated. This is a slightly different approach from the specific arrangement described in which the operator can select a higher position but the higher voltage is not applied to the pipe because of the actuation of a control relay. However, the end result is the same.

What I claim as my invention is:

1. A pipe thawing apparatus comprising a power source of relatively low voltage high current power having a first voltage output and a second voltage output which is higher than the first voltage output, a switch means associated with said power source and operable selectively between at least first and second conditions, said first condition defining said first voltage output and said second condition defining said second voltage output higher than said first voltage output, a means connected to said power source for applying the selected voltage to a pipe to be thawed, a current sensing means for sensing the current flowing in said pipe to be thawed and a control means connected to said current sensing means and to said switch means, said control means including means which are operable in response to said switch means being in said first condition and said sensed current being above a predetermined value so as to permit, on subsequent switching of said switch means to said second switch condition, application of said second voltage output to the pipe but operable in response to said sensed current being below said predetermined value so as to prevent application of said second voltage to said pipe.

2. A pipe thawing apparatus according to claim 1, further comprising an automatic tripping means controlled by said control means so as to interrupt said power supply in response to said sensed current being below said predetermined value.

3. A pipe thawing apparatus according to claim 2, further comprising a time delay means for delaying, by a predetermined time interval after sensing that said current is below said predetermined value, interruption of said power supply by supply automatic tripping means.

4. A pipe thawing apparatus according to claim 1, 2 or 3, further comprising a danger warning means operated by the control means in response to said sensed current being below said predetermined value.

5. A pipe thawing apparatus according to claim 1, 2 or 3, further comprising a "danger" warning means operated by said control means in response to said sensed current being below said predetermined level and an "add on cables" warning means operated by said control means in response to said sensed current being above a further predetermined value.

6. A pipe thawing apparatus according to claim 1, further comprising an automatic tripping means controlled by said control means so as to interrupt said power supply in response to said sensed current being below said predetermined value but above a second predetermined value.

7. A pipe thawing apparatus according to claim 6, further comprising a time delay means for delaying, by a predetermined time interval after sensing that said current is between said predetermined values, interruption of said power supply by said automatic tripping means.

8. A pipe thawing apparatus according to claim 1, further comprising a warning means operated by said control means in response to said sensed current being below said predetermined value but above a second predetermined value.

9. A pipe thawing apparatus according to claim 8, further comprising an automatic tripping means controlled by said control means so as to interrupt said power supply in response to said sensed current beng below said predetermined value but above said second predetermined value.

10. A pipe thawing apparatus according to claim 8, further comprising a time delay means for delaying, by a predetermined time interval after sensing that said current is between said predetermined values, interruption of said power supply by said automatic tripping means.

11. A pipe thawing apparatus according to claim 1, further comprising a "danger" warning means operated by said control means in response to said sensed current being below said predetermined value but above said second predetermined value and an "add on cables" warning means operated by said control means in response to said sensed current being above a further predetermined value.

12. A pipe thawing apparatus according to claim 11, further comprising an automatic tripping means controlled by said control means so as to interrupt said power supply in response to said sensed current being below said predetermined value but above said second predetermined value, said automatic tripping means also being controlled by said control means to interrupt said power supply in response to said sensed current being above, said further predetermined value.

13. A pipe thawing apparatus according to claim 12, further comprising a time delay means for delaying, by a predetermined time interval after sensing that said current is between said predetermined value and said predetermined second value, interruption of said power supply by said automatic tripping means.

14. A pipe thawing apparatus according to claim 1, wherein said power source includes a step-down transformer having a primary winding provided with prearranged tappings, said voltage applying means being operable to select predetermined combinations of the tappings whereby a plurality of selected output voltages including said first and second voltage outputs may be obtained at the transformer secondary winding.

15. A pipe thawing apparatus according to claim 14, wherein the output voltages range from approximately 12 volts to approximately 30 volts and wherein said first switch condition selects an output voltage of approximately 20 volts.

16. A pipe thawing apparatus comprising a power source of relatively low voltage high current power which is capable of providing a graduated voltage output, a switch means associated with said power source and operable selectively to provide said graduated voltage output, a means connected to said power source for applying said selected voltage to a pipe to be thawed, a current sensing means for sensing the current flowing in said pipe to be thawed and a control means connected to said current sensing means and to said switch means, said control means including means responsive to said switch means being in a position corresponding to a relatively low voltage and said sensed current being above a predetermined value to permit, on subsequent setting of said switch means to a position corresponding to a relatively higher voltage, application of said higher voltage to said pipe but in response to said sensed being below said predetermined value to prevent application of said higher voltage to said pipe.

17. A pipe thawing apparatus comprising a power source of relatively low voltage high current power having a first voltage output and a second voltage output which is higher than said first voltage output, a switch means associated with said power source and operable selectively between at least first and second conditions, said first condition defining said first voltage output and said second condition defining said second voltage output higher than the first output, a means connected to said power source for applying the selected voltage to a pipe to be thawed, a current sensing means for sensing the current flowing in said pipe to be thawed and a control means connected to said current sensing means and to said switch means, said control means including means which are operable in response to said switch means being in said first condition and said sensed current being above a predetermined value so as to permit subsequent switching, as desired, of said switch means to said second switch condition but operable in response to said sensed current being below said predetermined value so as to prevent switching to said second switch condition.

18. A control circuit for use with pipe thawing apparatus comprising a source of relatively low voltage high current power having a first voltage output and a second voltage output which is higher than said first voltage outputs, a switch means associated with said power source and operable selectively between at least first and second conditions, said second condition defining said second voltage output higher than said first voltage output, a means connected to said power source for applying the selected voltage to a pipe to be thawed and a current sensing means for sensing the current flowing in said pipe to be thawed, said control circuit having inputs from said switch means and said current sensing means and deriving a first output signal in response to said switch means being in said first condition and said sensed current being above a predetermined value and deriving a second output signal in response to said switch means being in said first condition and said sensed current being below said predetermined value, a means responsive to said first output signal for enabling application of said second voltage output to said pipe in response to said switch means being subsequently switched to said second condition, a means responsive to said second output signal for disabling application of said second voltage output to said pipe in response to said switch means being subsequently switched to said second condition.

* * * * *